Nov. 19, 1940.  V. HAIGH  2,221,896
TRANSMISSION SYNCHRONIZER
Filed June 9, 1938
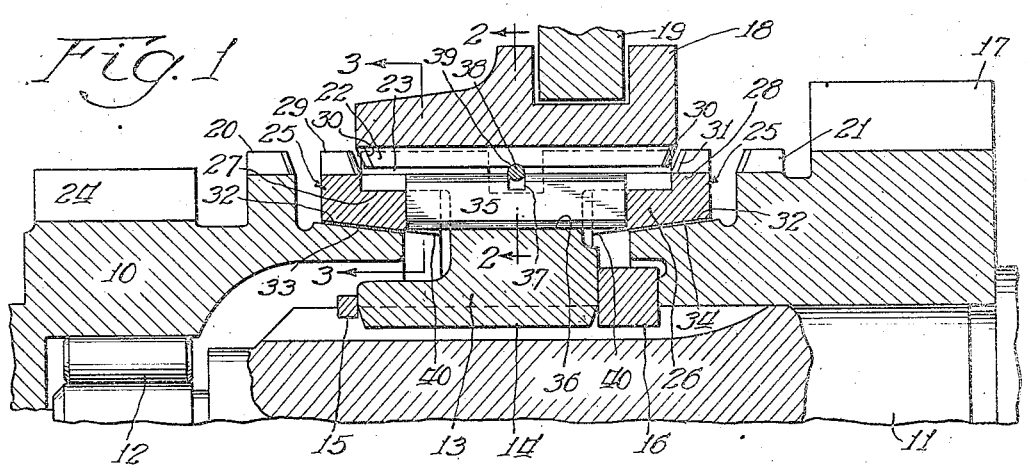
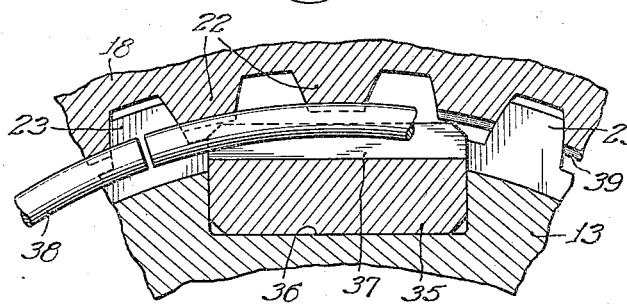
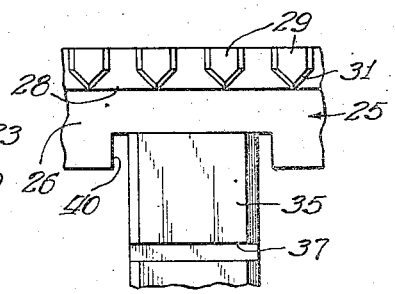
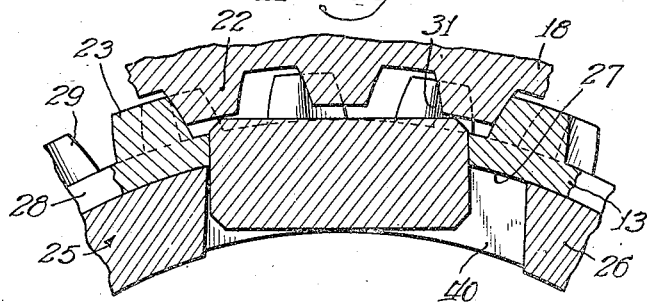
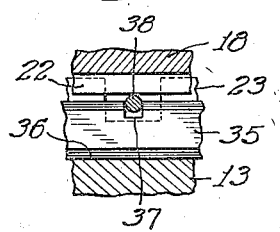
Inventor:
Vaughn Haigh.
By Edward C. Gritzbaugh
Atty.

Patented Nov. 19, 1940

2,221,896

UNITED STATES PATENT OFFICE 2,221,896

TRANSMISSION SYNCHRONIZER

Vaughn Haigh, Muncie, Ind., assignor to Borg-Warner Corporation, Chicago, Ill., a corporation of Illinois Application June 9, 1938, Serial No. 212,763

15 Claims. (Cl. 192—53)

This invention relates to synchronizing change-speed gear transmissions of the type employed, for example, in motor vehicles, wherein there is provided means for effecting synchronization of a pair or pairs of torque-transmitting members preparatory to connecting said members in positive drive engagement with each other.

The invention is particularly directed to synchronizing transmissions of the type wherein the synchronizing means comprises friction clutch elements adapted to become drivingly engaged with each other in the initial stage of shifting movement, as a result of axial thrust transmitted to one of such elements from the movable jaw clutch element, and wherein there is incorporated so-called "blocker" mechanism for preventing the positive drive engagement of the members prior to the time that synchronization is effected.

The invention is directed to the improvement of the means for transmitting axial thrust from the movable clutch element to the synchronizing element of a transmission of the type specified, and has as one of its objects to provide a transmission of this type in which the shifting operation may be accomplished with greater ease and smoothness than is possible in transmissions now available. Specifically, the invention contemplates greatly modifying, or eliminating entirely, the "poppet" or break-away connection between the movable clutch element and the thrust-transmitting means, conventionally employed in synchronizing transmissions.

The invention contemplates the employment of a plurality of axially disposed thrust-transmitting bars for transmitting thrust from the movable clutch element to the synchronizer element, and provides for frictional thrust-transmitting engagement between the bars and the interior of the movable clutch sleeve. Instead of making a direct frictional contact of the movable clutch element against the bars themselves, however, which would restrict the frictional engagement to the limited area of the bars, the invention provides a drag ring, which is adapted to frictionally engage the interior of the movable clutch sleeve around its entire circumference, and which has a positive thrust-transmitting connection with the bars.

Another object of the invention is to provide a synchronizing transmission which, in addition to the foregoing characteristics, is relatively simple and inexpensive in construction.

Another object of the invention is to provide a synchronizing transmission wherein a plurality of structurally independent thrust bars are tied together in such a manner that they are enforced to maintain positions in which their ends register in a common plane at right angles to the major axis of the transmission, so that pressure will be distributed equally around the circumference of the synchronizer ring during the synchronizer operation.

Other objects, the advantages and uses of the invention will become apparent after reading the following specification and claims, and after consideration of the drawing forming a part of the specification, wherein:

Fig. 1 is an axial sectional view of a portion of a motor vehicle transmission embodying the invention;

Fig. 2 is a transverse sectional view of the same, taken as indicated by the line 2—2 on Fig. 1;

Fig. 3 is a transverse sectional view of the same, taken as indicated by the line 3—3 on Fig. 1, the parts being shown in blocking position;

Fig. 4 is a plan view of coacting portions of a synchronizer ring and a thrust bar of the invention; and Fig. 5 is a fragmentary axial sectional view of a slightly modified form of the invention.

As illustrative of one form in which the invention may be embodied, I have shown in Fig. 1 a portion of a synchronizing transmission of the general type disclosed in the application of Samuel O. White, Serial No. 168,317, filed October 11, 1937. Such a transmission may include a torque-transmitting member 10, forming the rear end of the drive shaft of the transmission, and torque-transmitting members, including the driven shaft 11, piloted, as at 12, in the member 10, and the hub member 13 splined, as at 14, on the driven shaft 11, and secured against axial movement by retaining rings 15 and 16. Positive drive connection may be established between the torque-transmitting members 10 and 11, or between a reduction geared torque-transmitting member 17 and the member 11, by an axially movable jaw clutch element 18, adapted to be shifted by a shifting fork 19 into positive clutching engagement with clutch teeth 20 formed on the torque-transmitting member 10, or clutch teeth 21 formed on the torque-transmitting member 17. To this end, the movable clutch element 18 is formed with internal clutch teeth 22, in sliding splined engagement with teeth 23 forming the periphery of the hub member 13, and adapted to engage the clutch teeth 20 or 21 when moved axially.

The torque-transmitting member 17 comprises part of a reduction gear train driven from a pinion 24 on the drive shaft 10, through the medium of a conventional countershaft, such as is shown in the White application above referred to. Upon being moved into clutching engagement with the clutch teeth 20, the clutch member 18 will receive rotation from the drive shaft 10 and transmit it directly through the hub 13 to the driven shaft 11. Upon being moved in the opposite direction into clutching engagement with the teeth 21, the clutch member 18 will receive rotation from the torque-transmitting member 17 through the countershaft just referred to, and will transmit it through the hub member 13 to the driven shaft 11.

In order to synchronize a torque-transmitting member 10 or 17 with the hub 13, preparatory to establishing such clutching engagement, I provide a pair of synchronizer rings 25 each including a substantially cylindrical collar portion 26 rotatably floating in an annular groove 27 extending axially into the hub member 13, and a radially outwardly extending flange 28 formed with blocker teeth 29 between which the teeth 22 of the movable clutch element must pass before the clutching engagement may be had with the clutch teeth 20 or 21. The opposed ends of the teeth 22 and 29 may be chamfered, as shown at 30 and 31 respectively. The synchronizer rings 25 are provided with internal conical clutch faces 32 adapted to engage external conical clutch faces 33 and 34 respectively, formed on the torque-transmitting members 10 and 17. The rings 25 are adapted to be located and supported by the clutch faces 33 and 34. Intervening oil films prevent destructive wear as a result of such supporting arrangement.

In order to effect initial clutching engagement between a friction clutch face 33 or 34 and a cooperating friction face 32 on a ring 25, a ring 25 is moved axially by axial thrust transmitted to it from the movable clutch element through the medium of axially disposed thrust bars 35. The thrust bars 35 may be of any cross-sectional shape, although it is preferred to make them rectangular as shown. They may be very simply and inexpensively made by cutting sections from a rectangular rod of cold rolled steel.

The thrust bars are axially interposed between the movable clutch element 18 and the hub 13, being received in axial recesses 36 formed in the hub.

Each of the thrust bars 35 is provided with a transverse notch 37 in its radially outer region. Radially interposed between the thrust bars 35 and the movable clutch element 18, and having portions received in the notches 37, is a drag ring 38 of spring material. As a result of its engagement in the notches 37, the ring 38 is axially fixed with respect to the bars 35, and adapted to positively transmit axial thrust thereto.

The outer side of the ring 38 frictionally engages the internal teeth 22 of the movable clutch element 18, being confined thereby under compression, and therefore urged by its own expanding pressure into such frictional engagement. Since it engages all of the teeth 22, the ring 38 is adapted to receive, as a result of such frictional engagement, considerably more axial thrust than could be transmitted through friction directly to the bars 35.

The engagement of the ring 38 against the teeth 22 may be purely a frictional one, as in the form shown in Fig. 5. However, I prefer to provide a very shallow annular groove 39 in the teeth 22, adapted to receive the ring 38 when the movable clutch sleeve 18 is in neutral position, as shown in Fig. 1. This gives a slight "poppet" action without developing the resistance to break-away that is characteristic of the conventional poppet construction. This construction also is considerably less expensive than the conventional poppet construction. I find that in operation, the action is exceedingly smooth and easy.

The ends of the thrust bars are received in axially opening notches 40 in the synchronizer rings 25, as shown in Fig. 4. The notches 40 are circumferentially elongated sufficiently so that the synchronizer rings may have a limited amount of circumferential movement relative to the hub 13 before being stopped by contact with the thrust bars 35. When at one limit of such circumferential movement, a synchronizer ring will be in a blocking position wherein its blocker teeth 29 will obstruct axial advance of the movable clutch element 18 by engaging the teeth 22 thereof.

It is contemplated that the friction faces 32 of the synchronizer rings 25 and the friction faces 33 and 34 respectively, may be so closely associated when the movable clutch element is in neutral position, that a film of oil may exist between these faces and develop, under relative rotation thereof, a slight "oil drag" tending constantly to bias the synchronizer rings toward the limits of their lost motion connections. Should a synchronizer ring fail to be biased in blocking position at the beginning of a shifting operation, the initial stage of shifting movement will cause thrust to be transmitted from the sleeve 18 to the ring 38, from the ring 38 to the bars 35, and from the bars 35 to the synchronizer ring 25, so as to cause the latter to frictionally engage its cooperating friction clutch element with sufficient intensity to cause the ring to become biased. Additional axial thrust exerted through the shifting mechanism against the synchronizer ring will increase the frictional engagement to such an extent that the engaging faces will move toward synchronization. Should an impatient operator exert an undue amount of pressure against the shift lever, sufficient to cause the movable clutch element to slip with relation to the thrust bars 35, prior to synchronization, the synchronizer operation will be completed by the axial thrust transmitted by direct contact of the teeth 22 against the blocker teeth 29.

When synchronization is attained, there will be a momentary reversal of the relative directions of rotation of the torque-transmitting members, causing the synchronizing ring to be oscillated toward its other limit of lost motion movement relative to the hub 13, and in so doing, it will reach a position wherein the internal teeth 22 of the movable clutch element 18 are in register with the spaces between the blocker teeth 29, whereupon the teeth 22, which have already commenced to move into such spaces, owing to the chamfered faces 30 and 31 of the respective sets of teeth, will, under the continuous urging pressure of the shifting member 19, slide between the teeth 29 and into engagement with the now synchronized clutch teeth 20 or 21. In this stage of movement, the resistance to advance of the movable clutch element has been reduced to the relatively small resistance occasioned by the engagement between the ring 38 and the teeth 22 of the movable clutch sleeve 18.

The invention provides an arrangement wherein a plurality of structurally independent thrust bars are tied together against independent longitudinal movement, and thereby maintained at all times in operative position wherein their ends are enforced to register in common planes, the tie means also comprising the means for transmitting thrust to the bars from the entire interior periphery of the movable clutch sleeve. The close fit of the ring in the notches 37 prevents the ring from canting from its proper perpendicular plane.

Thus the possibility of unequal transmission of thrust, which might occur as a result of unequal frictional engagement between the sleeve and the bars, or unequal resistance to their movement, is eliminated.

I claim:

1. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a plurality of axially disposed thrust bars radially interposed between said movable clutch element and said one torque-transmitting member, said bars having their ends disposed in abutting, thrust-transmitting relationship to said synchronizer element and arranged to receive axial thrust from said movable clutch element, and means constantly engaged in transverse notches in said bars defined between surfaces which are perpendicular to the axis of the torque transmitting members, and tying said bars together so as to constrain them to move collectively while maintaining positions with their ends registering in a common plane at right angles to the axis of movement.

2. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a plurality of axially disposed thrust bars radially interposed between said movable clutch element and said one torque-transmitting member, said bars having their ends disposed in abutting, thrust-transmitting relationship to said synchronizer element, and means tying said bars together so as to constrain them to move collectively with their ends at all times in register in a common plane at right angles to the axis of movement, said means being in engagement with the interior of said movable clutch element so as to receive thrust therefrom.

3. In a synchronizing transmission, a pair of axially aligned torque-transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a plurality of axially disposed thrust bars radially interposed between said movable clutch element and said one torque-transmitting member, said bars having their ends disposed in abutting, thrust-transmitting relationship to said synchronizer element, and a drag ring radially interposed between said thrust bars and said movable clutch element, said ring being in axially yieldable thrust-transmitting engagement with said movable clutch element and in axially fixed thrust-transmitting engagement with said thrust bars.

4. In a synchronizing transmission, a pair of torque-transmitting members mounted in axial alignment, an annular movable jaw clutch element surrounding and carried by one of said members and adapted to be moved into engagement with a jaw clutch element carried by the other member, thus to establish a positive drive connection between said members, a synchronizer element associated with said one torque-transmitting member and adapted under axial pressure to establish frictional synchronizing engagement with said other torque-transmitting member to establish a friction drive between said members, and means for transmitting axial thrust from said movable clutch element to said synchronizer element for effecting said frictional driving engagement, comprising a plurality of axially disposed thrust bars radially interposed between said movable clutch element and said one torque-transmitting member, and having their ends disposed in abutting, thrust-transmitting relationship to said synchronizer element, and a drag ring radially interposed between said thrust bars and said movable clutch element, said ring being in axially yieldable thrust-transmitting engagement with said movable clutch element and in axially fixed thrust-transmitting engagement with said thrust bars.

5. A synchronizing transmission as defined in claim 4, wherein the engagement between said ring and said movable clutch element is a purely frictional one.

6. A synchronizing transmission as defined in claim 4, wherein said movable clutch element is provided with a shallow annular groove in which said ring engages when the movable clutch element is in neutral position.

7. A synchronizing transmission, as defined in claim 4, wherein the said engagement between said ring and bars is furnished by transverse grooves in the outer regions of the bars, receiving circumferentially spaced portions of said ring.

8. A synchronizing transmission, as defined in claim 4, wherein the said engagement between said ring and bars is furnished by transverse notches in the radially outer regions of said bars, receiving circumferentially spaced portions of said ring, and wherein said movable clutch element is provided in its interior with a shallow annular groove in which said ring engages when the movable clutch element is in neutral position.

9. In a synchronizing transmission, a pair of axially aligned torque-transmitting members, one of which includes a hub, a movable jaw clutch sleeve having internal teeth in axially shiftable splined engagement with teeth on said hub, said sleeve being adapted to be moved axially into engagement with a jaw clutch element carried by the other torque-transmitting member, thus to establish a positive drive connection, a synchronizer element adapted under axial pressure to establish frictional synchronizing engagement with said other member, having a lost motion driving connection with said hub, and including blocking teeth adapted, in one of its positions permitted by said lost motion connection, to block the axial advance of said sleeve by engagement with the internal teeth thereof, and means for transmitting axial thrust comprising a plurality of thrust bars radially interposed between said sleeve and said hub, received in and axially movable in axial recesses in said hub, and having their ends disposed in abutting, thrust-transmitting relation to said synchronizer element, and a drag ring radially interposed between said thrust bars and said movable clutch sleeve, in expanding, yielding frictional thrust-transmitting engagement with said internal teeth of the sleeve, said bars having in their outer regions, transverse notches receiving portions of said drag ring whereby the latter is in axially fixed thrust-transmitting relation to said bars.

10. In a synchronizing transmission, axially aligned driving and driven shafts, opposed jaw clutch elements drivingly associated with the respective shafts, a hub carried by one of the shafts and disposed between said jaw clutch elements, a movable jaw clutch sleeve having internal clutch teeth splined upon the periphery of said hub and axially movable into positive clutching engagement with either of said jaw clutch elements, opposed synchronizer cones drivingly associated with opposite sides of said hub and adapted under axial pressure to establish frictional synchronizing engagement with coacting friction clutch members drivingly associated with the respective jaw clutch elements, and means for transmitting axial thrust from said sleeve to either of said synchronizer cones, comprising a plurality of thrust bars radially interposed between said sleeve and said hub, and having their ends disposed in abutting, thrust-transmitting relation to the respective synchronizer cones, and a drag ring radially interposed between said thrust bars and said movable clutch element, said ring being in axially yieldable thrust-transmitting engagement with the internal teeth of said sleeve, and in axially fixed thrust-transmitting engagement with said thrust bars.

11. In a synchronizing transmission, a pair of axially aligned torque transmitting members, synchronizer and movable jaw clutch elements drivingly associated with one of said members and movable axially into frictional driving and positive clutching engagement, respectively, with friction and jaw clutch elements drivingly associated with the other member, thereby to establish first a frictional and then a positive driving connection between said members, and means for transmitting axial thrust from said movable clutch element to said synchronizer element for effecting said frictional driving connection, comprising a plurality of axially disposed thrust bars radially interposed between said movable clutch element and said one torque transmitting member, said bars being arranged in thrust transmitting relationship to said synchronizer element, and means tying said bars together against independent axial movement, said means being in engagement with the interior of said movable clutch element so as to receive thrust therefrom.

12. In a synchronizing transmission, a pair of axially aligned torque transmitting members, synchronizer and movable jaw clutch elements drivingly associated with one of said members and movable axially into frictional driving and positive clutching engagement, respectively, with friction and jaw clutch elements carried by the other member, so as to establish first a frictional and then a positive driving connection between said members, and means for transmitting axial thrust from said movable clutch element to said synchronizer element for effecting said frictional driving engagement, comprising a plurality of axially disposed thrust bars radially interposed between said movable clutch element and said one torque transmitting member, and axially movable relative to both, said bars being in positive thrust transmitting relationship to said synchronizer element, and a drag ring radially interposed between said bars and said movable clutch element, said ring being in axially yieldable thrust transmitting engagement with said movable clutch element and in axially fixed thrust transmitting engagement with said thrust bars.

13. In a synchronizing transmission, axially aligned driving and driven shafts, opposed jaw clutch elements drivingly associated with the respective shafts, a hub carried by one of the shafts and disposed between such clutch elements, a movable jaw clutch sleeve having internal clutch teeth splined upon the periphery of said hub and axially movable into positive clutching engagement with either of said jaw clutch elements, opposed synchronizer cones drivingly associated with opposite sides of said hub and axially movable into frictional driving engagement with coacting friction clutch elements drivingly associated with the respective jaw clutch elements, and means for transmitting axial thrust from said sleeve to either of said synchronizer cones, comprising a plurality of thrust bars radially interposed between said sleeve and said hub and arranged in positive thrust transmitting relationship to the respective synchronizer cones, and a drag ring radially interposed between said thrust bars and said movable clutch elements, said ring being in axially yieldable thrust transmitting engagement with the internal teeth of said sleeve and in axially fixed thrust transmitting engagement with said thrust bars.

14. In a synchronizing transmission, a pair of axially aligned torque transmitting members, synchronizer and movable jaw clutch elements drivingly associated with one of said members and movable axially into frictional driving and positive clutching engagement, respectively, with friction and jaw clutch elements carried by the other member, so as to establish first a synchronizing and then a positive drive connection between said members, and means for transmitting axial thrust from said movable clutch element to said synchronizer element for effecting said frictional driving engagement, comprising a plurality of axially disposed thrust bars radially interposed between said movable clutch element and said one torque transmitting member, said bars being arranged in positive thrust transmitting relationship to said synchronizer element, and a drag ring radially interposed between said thrust bars and said movable clutch element, said ring being in axially yieldable thrust transmitting engagement with said movable clutch element and engaged in transverse notches in said thrust bars.

15. In a synchronizing transmission, a pair of axially aligned torque transmitting members, one of which includes a hub portion, a movable jaw clutch sleeve having internal teeth in axially shiftable splined engagement with teeth on said hub, said sleeve being adapted to be moved axially into engagement with a jaw clutch element carried by the other torque transmitting member, thus to establish a positive drive connection between said members, a synchronizer element axially recessed into and drivingly connected to said hub portion, said synchronizer element being axially shiftable into frictional driving engagement with a coacting friction clutch element drivingly associated with the other torque transmitting member, and means for transmitting axial thrust from said movable jaw clutch sleeve to said synchronizer element for effecting said frictional driving engagement, comprising a plurality of axially disposed thrust bars radially interposed between said sleeve and said hub, and arranged in positive thrust transmitting relationship to said synchronizing element and in yielding thrust receiving relationship to said sleeve, and means tying said bars together against independent axial movement.

VAUGHN HAIGH.